United States Patent [19]

Honda

[11] Patent Number: 4,893,046

[45] Date of Patent: Jan. 9, 1990

[54] ULTRASONIC DRIVING DEVICE
[75] Inventor: Keisuke Honda, Aichi, Japan
[73] Assignee: Honda Electronic Co., Ltd., Aichi, Japan
[21] Appl. No.: 241,602
[22] Filed: Sep. 8, 1988
[51] Int. Cl.⁴ ............................................. H01L 41/08
[52] U.S. Cl. ....................................... 310/323; 310/325
[58] Field of Search .......................... 310/323, 328, 325

[56] References Cited

U.S. PATENT DOCUMENTS 4,634,916 1/1987 Okada et al. .......................... 310/323
4,663,556 5/1987 Kumada ............................ 310/328 X
4,752,711 6/1988 Tsukimoto et al. ................... 310/323

Primary Examiner—Mark O. Budd
Attorney, Agent, or Firm—Burgess, Ryan and Wayne

[57] ABSTRACT

A rotary member rotatably supports a plurality of balls, disks or rolls which are pressed on a stator by a pressure member. When the stator generates progressive wave, the balls, disks or rolls are rolled on the stator and the pressure member by the progressive waves. Since the balls, disks or rolls are rolled on the stator and the pressure member, the wear of the stator, the pressure member and the balls, disks or rolls is decreased. Lubricative oil may be applied to the circumference of the balls, disks or rolls of the rotary member.

9 Claims, 6 Drawing Sheets

PRIOR ART

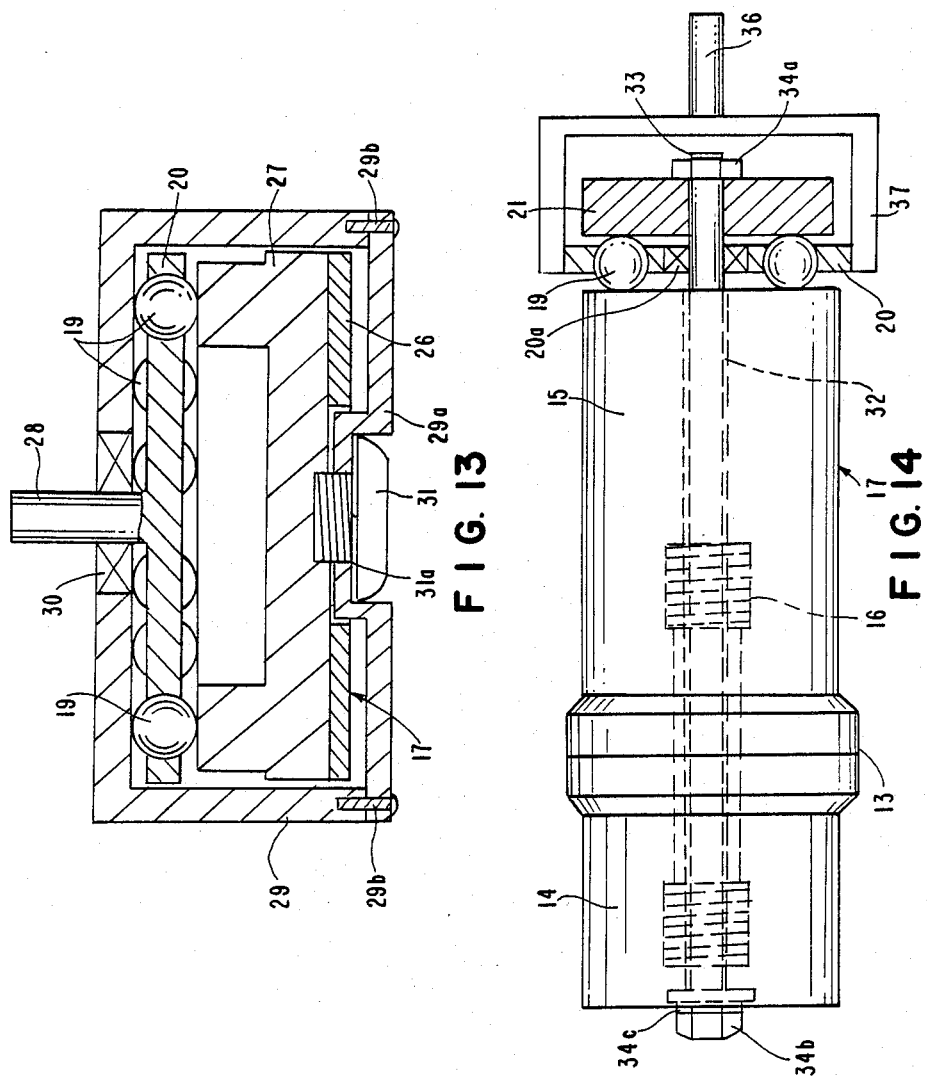

ULTRASONIC DRIVING DEVICE

BACKGROUND OF THE INVENTION

The present invention relates to an ultrasonic driving device having a structure for decreasing wear between a stator and a rotary member.

In a known ultrasonic motor using a ring type piezoelectric vibrator, two groups of electrodes are attached to one end of a ring type piezoelectric ceramic, the two groups of electrodes are so positioned that standing waves respectively generated by the two groups of electrodes are shifted every $\pi/2$ in each position. The parts of the ring type piezoelectric vibrator corresponding to the electrode are alternately polarized in reverse. Also, the two groups of the electrodes are respectively connected to two oscillators for respectively generating alternating current voltages having $\pi/2$ phase shift from each other. When the alternating current voltages from the two oscillators are respectively applied to the two groups of electrodes, the two standing waves having $\pi/2$ phase shift from each other are generated on the surfaces of the ring type piezoelectric vibrator and then progressive waves owing to compound of the two standing waves are generated on the surfaces of the ring type piezoelectric vibrator. Therefore, when a slider attaching a rotary member is put on the ring type piezoelectric vibrator and is strongly pressed to the ring type piezoelectric vibrator, the rotary member is rotated by the progressive waves.

In the prior ultrasonic motor, however, the slider is easily worn out because the slider of the rotary member is directly pressed on the piezoelectric vibrator.

There is known an ultrasonic motor comprising a Langevin type vibrator having two ring type piezoelectric vibrators which are put between two metal blocks. In this ultrasonic motor, a twisting joint body is connected to the end of the one metal block by a bolt for fixing the metal blocks and the piezoelectric vibrator and a rotary member is pressed on the twisting joint body by a spring.

In this ultrasonic motor, however, the rotary member is easily worn out because the rotary member is pressed on the twisting joint body.

SUMMARY OF THE INVENTION

It is, therefore, the primary object of the present invention to provide an ultrasonic driving device having a structure for decreasing wear of a rotary member or a stator.

It is another object of the present invention to provide an ultrasonic driving device having a rotary member in which balls, disks or rolls are rotatably attached for decreasing wear of the rotary member.

It is another object of the present invention to provide an ultrasonic driving device in which lubricate oil is supplied to the circumference of balls, disks or rolls of a rotary member for decreasing wear of the rotary member.

In order to accomplish the above and other object, the present invention comprises a stator for generating a progressive wave by driving a piezoelectric vibrator or vibrators, a rotary member rotatably attaching a plurality balls, disks or rolls, and pressure means for making the balls, disks or rolls contact with the stator.

BRIEF DESCRIPTION OF THE DRAWINGS

FIG. 13 shows a side sectional view of an ultrasonic driving device another embodiment according to the present invention.

FIG. 14 shows a side view of a concrete composition of the ultrasonic driving device in FIG. 6.

DESCRIPTION OF THE PREFERRED EMBODIMENTS

Figure 1:
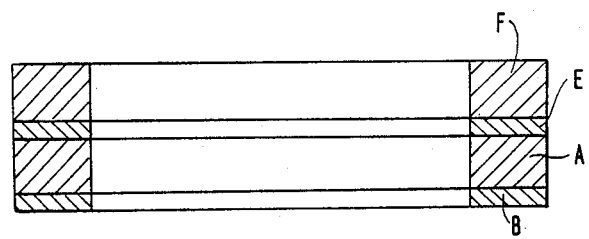
FIG. 1 shows a sectional view of an ultrasonic motor in the prior art.
Figure 2:
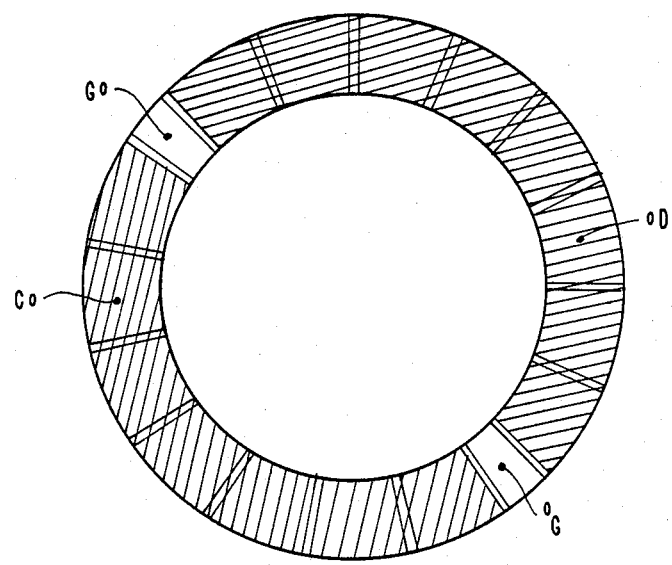
FIG. 2 shows a plane view of a form of a piezoelectric vibrator and a composition of electrodes of the piezoelectric vibrator in the ultrasonic motor in FIG. 1.

Referring to the prior art in FIG. 1, a ring type piezoelectric vibrator B is attached to a ring type resilient member A and the piezoelectric vibrator B vibrates with the resilient member. The piezoelectric vibrator B is divided in 17 parts by a ratio of e.g. 22.5° or 11.25°. The respective neighboring portions in the 17 parts of the piezoelectric vibrator B are polarized by the reverse polarity to each other as shown in FIG. 2. The two portions C and D in the one side of the piezoelectric vibrator B are respectively attached as an electrode by conductive paint as shown in FIG. 2. The portion G in FIG. 2 shows an earth electrode. The member F to be driven to which slider E is attached is mounted on the resilient member A.

In the ultrasonic motor in the prior art, the alternating current voltage of $V_0 \sin \omega t$ is applied to the one electrode C and the alternating current voltage $V_0 \cos \omega t$ is applied to the other electrode D, where $V_0$ is instantaneous value, $\omega$ is an radian frequency and t is time. The phases of these voltages shift by $\pi/2$ from each other. Thereby, the divided portions of the piezoelectric vibrator B alternately produce expansion and contraction and thus, the resilient member A produces bending vibration. Therefore, a standing wave is generated in the resilient member A and a progressive wave is generated on the resilient member A. Thus, the driven member F having the slider E is rotated on the resilient member A.

However, in the prior ultrasonic motor, because the slider E is strongly contacted with the resilient member A, the slider E or the resilient member A is worn out and the life of the ultrasonic motor is short.

Figure 3:
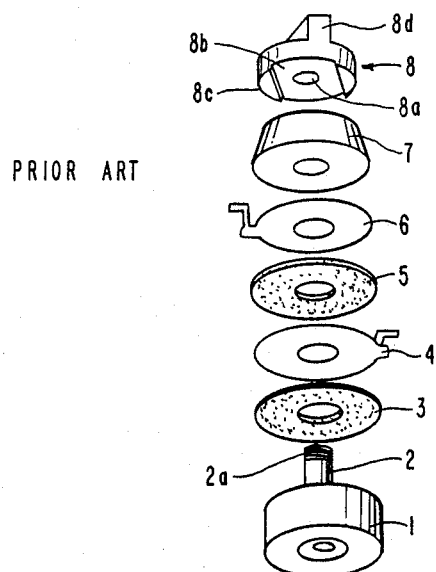
FIG. 3 shows a separated perspective view of the stator of an ultrasonic motor in the prior art.

Referring to the prior art in FIG. 3, a piezoelectric vibrator 3, a terminal plate 4, a piezoelectric vibrator 5, a terminal plate 6 and an aluminum disk 7 are put on a washer 1 and a bolt 2 is inserted through the center holes of these members. The screw 2a of the bolt 2 is engaged with the screw hole 8a of a twisting joint body 8. A drain 8b is formed on the under surface of the twisting joint body 8, arcuate projections 8c are formed in both sides of drain 8b, and a beam 8d is so formed in the upper portion of the twisting joint body 8 that an angle between the beam 8d and drain 8b becomes a predetermined value.

In the prior ultrasonic driving device, when alternating current voltage is applied through the terminal plates 4 and 6 to the piezoelectric vibrators 3 and 5 and the piezoelectric vibrators 3 and 5 are vibrated in the direction of their thickness, the arcuate projections 8c of the twisting joint body 8 are pushed and twisted by the vibration of the piezoelectric vibrators 3 and 5. Therefore, the twisting joint body 8 is vibrated to be twisted. When the excitation frequency of the alternating current voltage approaches a resonance frequency, elliptic vibration arises on the beam 8d of the twisting joint body 8.

Figure 4:
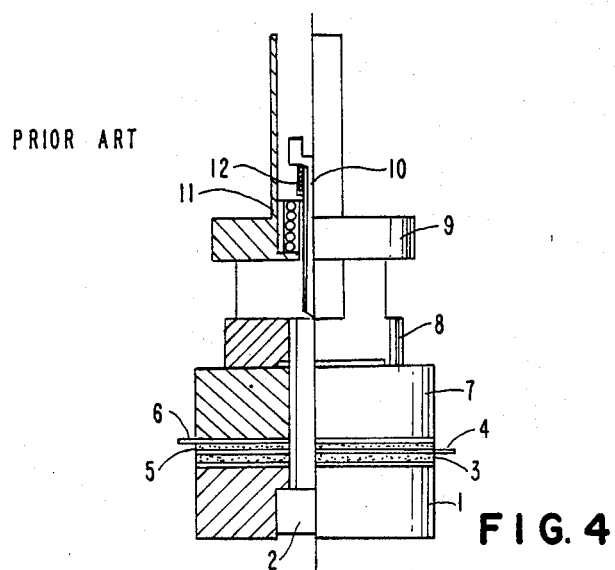
FIG. 4 shows a side view having a partial sectional view of an ultrasonic motor in the prior art.

Therefore, as shown in FIG. 4, a rotary member 9 is put on of the beam 8d of the twisting joint body 8, a center bolt 10 passed through a bearing 11 of the rotary member 9 fixes the twisting joint body 8, and a spring 12 is attached between the upper end of the bolt 10 and the bearing 11, whereby the rotary member 9 is strongly touched on the beam 8d of the twisting joint body 8 and is rotated by the elliptic vibration on the beam 8d.

However, in the prior ultrasonic motor, because the rotary member 9 is strongly contacted with the beam 8d of the twisting joint body 8, the beam 8d or the rotary member 9 is worn out and the life of the ultrasonic motor is short.

Figure 5:
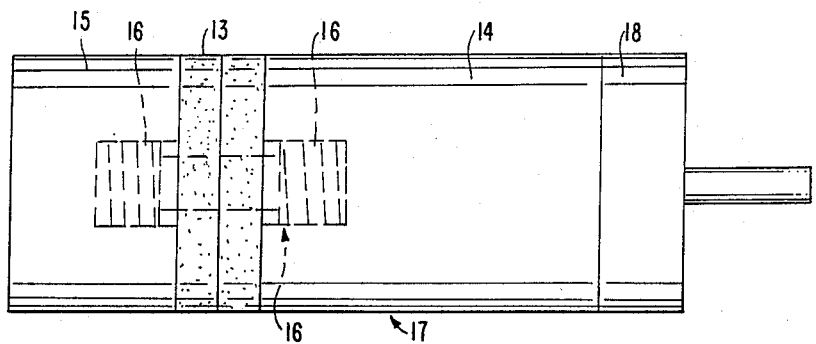
FIG. 5 shows a side view of an ultrasonic driving device provided by the present applicant.

Referring to FIG. 5, in the ultrasonic driving device provided by the present applicant (see U.S. patent application Ser. No. 164,058), ring type piezoelectric vibrators 13 of piezoelectric ceramics are put between a short metal block 14 and a long metal block 15, male screwthreads 16a and 16b of both ends of a bolt 16 are engaged with female screwthreads of the metal blocks 14 and 15, whereby a stator 17 is constituted. A rotary member 18 is strongly contacted with one end of the stator 17 by a spring.

In the above ultrasonic driving device, when alternating current voltage is supplied to the piezoelectric vibrators 13, the vibration toward the thickness arises in the piezoelectric vibrators 13 and then presses the metal blocks 14 and 15. The pressure of the metal blocks 14 and 15 is influenced by the screwthreads 16a and 16b of the bolt 16, whereby twist vibration arises in the metal blocks 14 and 15. When the resonance frequency of the twist vibration is coincident with that of the vibration toward the thickness of the piezoelectric vibrators 13, a progressive wave (ellipse vibration) arises on the ends and side portion of the stator 17. Therefore, when the rotary member 18 is contacted with the end of the stator 17, the rotary member 18 is smoothly rotated.

In the ultrasonic driving device, however, the rotary member 18 is strongly pressed to the stator 17 by a spring for transmitting the ellipse vibration generated on the end of the stator 17 to the rotary member 18. Therefore, the contact faces between the end of the stator 17 and the rotary member 18 are worn on each other. Thus, a lining material is put between the end of the stator 17 and the rotary member 18 for decreasing the wear between the stator 17 and the rotary member 18. However, even if the lining material is put between the end of the stator 17 and rotary member 18, the lining material is worn out, noise generates in the contact face between the stator 17 and the rotary member 18 and the life of the ultrasonic driving device is short.

Figure 6:
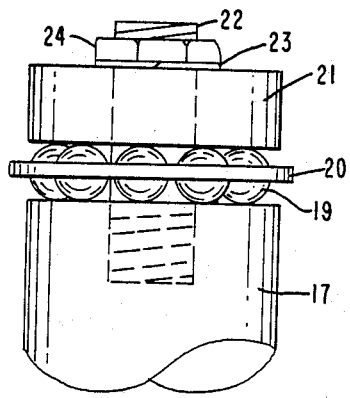
FIG. 6 shows a side view of one part of an ultrasonic driving device of an embodiment in the present invention.
Figure 7:
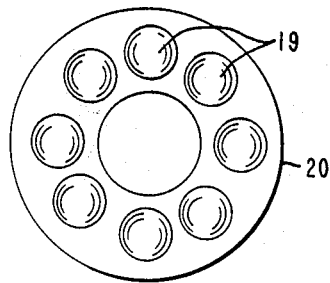
FIG. 7 shows a plane view of a rotary member of the ultrasonic driving device in FIG. 6.

Referring to FIGS. 6 and 7, a plurality of balls 19 are rotatably supported in the rotary member 20 and these balls are contacted with the end of the stator 17 as shown in FIG. 5. One end of a bolt 22 is engaged with screwthreads at the end of the stator 17 and the other end of the bolt 22 is passed through the center holes of the rotary member 20, a pressure member 21 and a spring washer 23 and then, a nut 24 are engaged with the screwthreads at the other end of the bolt 22. Therefore, the balls 19 are pressed on the end of the stator 17 by the pressure member 21.

Figure 8:
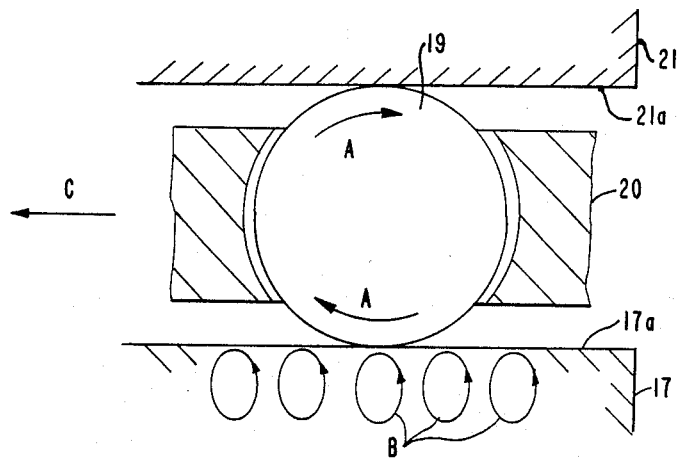
FIG. 8 shows a view for explaining a principle of an ultrasonic driving device in FIG. 6.

Explaining the motion of the ultrasonic driving device according to the present invention, in FIG. 8, when the progressive wave is generated on the end of the stator 17 as shown by in the arrows B, the balls 19 are rotated in the direction of arrows A. When the balls 19 are rotated in the direction of arrows A, friction arises on the contact portion between the balls 19 and the surface 21a of the pressure member 21 and thus the balls 19 roll on the surface 21a of the pressure member 21. The rotary member 20 is rotated toward the arrow C according to the rotation of the balls 19.

Therefore, when teeth of a gear are formed on the side of the rotary member 20 and are engaged with an other gear, the rotary force of the rotary member 20 is transmitted through the other gear to the other machine and the ultrasonic driving device according to the present invention is used instead of a known electric motor.

When lubricative oil is supplied to the circumference of the balls 19, the lubricative oil influences the rotation of the balls 19 for good, because the balls are respectively contacted with the surface 21a of the pressure member 21 by each point and are glided on the end of the stator 17. The wear of the balls 19, the end of the stator 17 and the pressure member 21 is decreased. Therefore, the life of the ultrasonic driving device according to the present invention becomes long.

Figure 9:
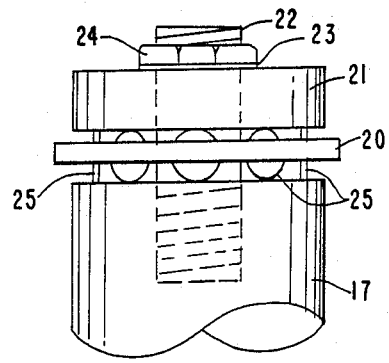
FIG. 9 shows a side view of an ultrasonic driving device of the other embodiment according to the present invention.

Referring to FIG. 9, 17 designates a stator, 20; a rotary member, 21; a pressure member, 22; a bolt, 23; a washer, 24; a nut. These compositions are the same as those in FIG. 6 and a plurality of disks or rolls are rotatably supported with the rotary member 20 in a circle instead of the balls 19.

The ultrasonic driving device of this embodiment is driven the same as the above embodiment and has the same effect.

Figure 11:
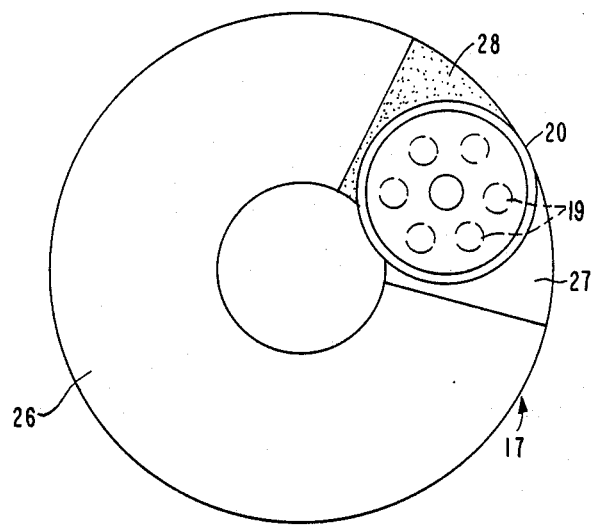
FIG. 11 shows a plane view of an ultrasonic driving device of another embodiment according to the present invention.
Figure 12:
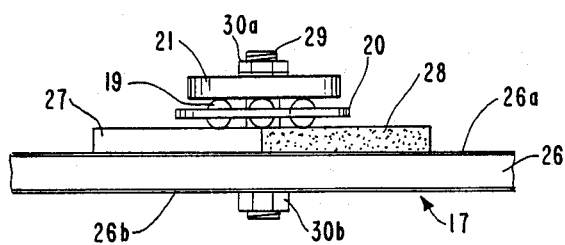
FIG. 12 shows a side sectional view of an ultrasonic driving device another embodiment according to the present invention.

Referring to FIGS. 11 and 12, electrodes 26a and 26b are formed on both ends of a ring type ceramic piezoelectric vibrator 26a and a member 27 for transmitting vibration and a member 28 for not transmitting vibration are closely attached with the same thickness on the electrode 26a of the piezoelectric vibrator 26. A bolt 29 is passed through the holes of the close portion between the members 27 and 28, the piezoelectric vibrator 26 and the electrodes 26a and 26b and holes of a rotary member 20 supporting balls 19 and a pressure member 21. The screwthreads at both ends of the bolt are engaged with nuts 30a and 30b and these elements are fixed.

The ultrasonic driving device having this ring type piezoelectric vibrator 26 is provided by the applicant (Japanese Patent Application 48515/1987). When alternating current voltage is applied to the electrodes 26a and 26b in the ultrasonic driving device, a progressive wave is generated from its circumferential edge to its center edge on both sides of the piezoelectric vibrator 26. Therefore, the balls 19 are rotated according to the progressive wave transmitted through the member 27 and thus the rotary member 20 is rotated with the balls 19.

Figure 10:
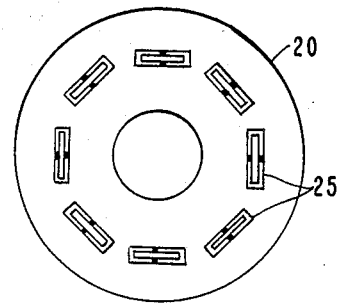
FIG. 10 shows a plane view of a rotary member of ultrasonic driving device in FIG. 9.

In this embodiment, rolls and disks are used instead of the balls as shown in FIGS. 9 and 10.

Referring to FIG. 13, in an ultrasonic driving device of an other embodiment according to the present invention, a resilient member 27 and a piezoelectric vibrator 26 are the same as the resilient member A and the piezoelectric vibrator B in FIG. 1. A plurality of balls 19 supported with a rotary member 20 are contacted with the resilient member 27. A rotary shaft 28 of the rotary member 20 protrudes beyond a bearing 30 of a case 29. A screw 31 is engaged with the screw of the resilient member 27 through the holes of a bottom plate 29a and a washer 31a, and the bottom plate 29a is fixed with the case 29 by screws 29b. Therefore, the balls 19 are strongly contacted with the inside of the case 29 and the surface of the resilient member 27 by the rotation of the screw 31.

In the ultrasonic driving device of another embodiment according to the present invention, the balls 19 are rotated with the progressive wave, whereby the rotary member 20 is rotated. Therefore, the rotary force is obtained from the rotary shaft 28.

In this embodiment, rolls and disks are used instead of the balls as shown in FIGS. 9 and 10.

Referring to FIG. 14, in an ultrasonic driving device of another embodiment according to the present invention, a stator 17 comprises a short metal block 14, a long metal block 15 and a bolt 16 and is the same as the stator 17 in FIG. 5. A hole 32 is formed through the metal blocks 14 and 15 and bolt 16 and a bolt 33 is passed through the hole 32. The one end of bolt 33 is engaged with a nut 34b and a spring washer 34c and the other end of the bolt 33 is passed through a bearing 20a supported with a rotary member 20 and a hole of a pressure member and is engaged with a nut 34a. Balls 19 rotatably supported with the rotary member 20 are pressed between the end of the stator 17 and the pressure member 21. Both ends of an arm 37 having a rotary shaft 36 are fixed with both sides of the rotary member 20.

In this ultrasonic driving device, when the balls 19 are rotated owing to the progressive wave generated on the end of the stator 17, the rotary member 20 is rotated and the rotary shaft 36 is rotated. Therefore, this ultrasonic driving device can be used instead of the known electric motor.

What is claimed is:

1. An ultrasonic driving device comprising
   (a) disk-type rotary means for rotating a rotary machine element, said rotary means including means for rotatably holding a plurality of rolling means with the rolling means being exposed at opposite surfaces of the rotary means;
   (b) a stator means for producing a progressive wave, said stator means being in contact with the rolling means extending from one surface of the rotary means;
   (c) pressure means for pressing the rolling means of the rotary means to the stator means, said pressure means being in contact with the rolling means extending from the opposite surface of the rotary means; and
   (d) fixing means for fixing the rolling means of the rotary means between the pressure means and the stator means;
   whereby movement of the rolling means with the progressive wave on the stator means causes rotation of the rotary means.

2. An ultrasonic driving device according to claim 1, wherein said rolling means includes a rolling circumference, and further comprising lubricating oil applied to the rolling circumference of the rolling means.

3. An ultrasonic driving device according to claim 1, wherein said stator means includes at least one ceramic piezoelectric vibrator, two metal blocks and bolt means for securing said at least one piezoelectric vibrator with said two metal blocks.

4. An ultrasonic driving device according to claim 1, wherein said stator means includes a ring type ceramic piezoelectric vibrator having electrodes at opposite sides thereof.

5. An ultrasonic driving device according to claim 1, wherein said stator means includes a ring type ceramic piezoelectric vibrator which is divided into a plurality of sections, adjacent sections of the piezoelectric vibrator being alternately polarized, said sections being divided into two groups, and two electrodes respectively attached to the two groups, and further comprising means for supplying alternating current voltages having a phase shift 90° displaced with respect to each other to the two electrodes.

6. An ultrasonic driving device according to claim 1, wherein said stator means includes at least one piezoelectric vibrator that is driven to produce said progressive wave, and a bolt having one end threadedly connected with the stator and an opposite end threadedly engaged with a nut.

7. An ultrasonic driving device according to claim 1, wherein said stator means includes a ring type ceramic piezoelectric vibrator having electrodes on opposite sides thereof, a vibration-transmitting material and a vibration-isolating material closely attached on the electrode at one side of the piezoelectric vibrator; said pressure means presses the rolling means into contact with the vibration-transmitting material and the vibration-isolating material, and further comprising a bolt passing through holes of the stator means, the rotary means and the pressure means, said bolt having threads at opposite ends thereof which are threadedly engaged by respective nuts.

8. An ultrasonic driving device according to claim 1, further comprising a case having a bearing and a rotary shaft protruding beyond the bearing of the case; said stator means includes a ring type ceramic piezoelectric vibrator and a resilient member such that the rolling means is in contact with the resilient member; and further comprising screw means engaged with a bottom plate of the case for pressing the resilient member.

9. An ultrasonic driving device according to claim 1, wherein said stator means includes at least one ceramic piezoelectric vibrator, two metal blocks and bolt means for securing together said at least one piezoelectric vibrator and said two metal blocks and for generating the progressive wave by driving the at least one piezoelectric vibrator, said rotary means includes a rotary shaft fixed by an arm and further including a bolt passing through holes of the bolt means of the stator, the rotary means and the pressure means, screwthreads at opposite ends of the bolt being engaged by respective nuts.

* * * * *